Aug. 20, 1957 E. W. STOTZ 2,803,336
CASE FOR PACKING ARTICLES FOR SHIPMENT
Filed Feb. 23, 1951 2 Sheets-Sheet 1
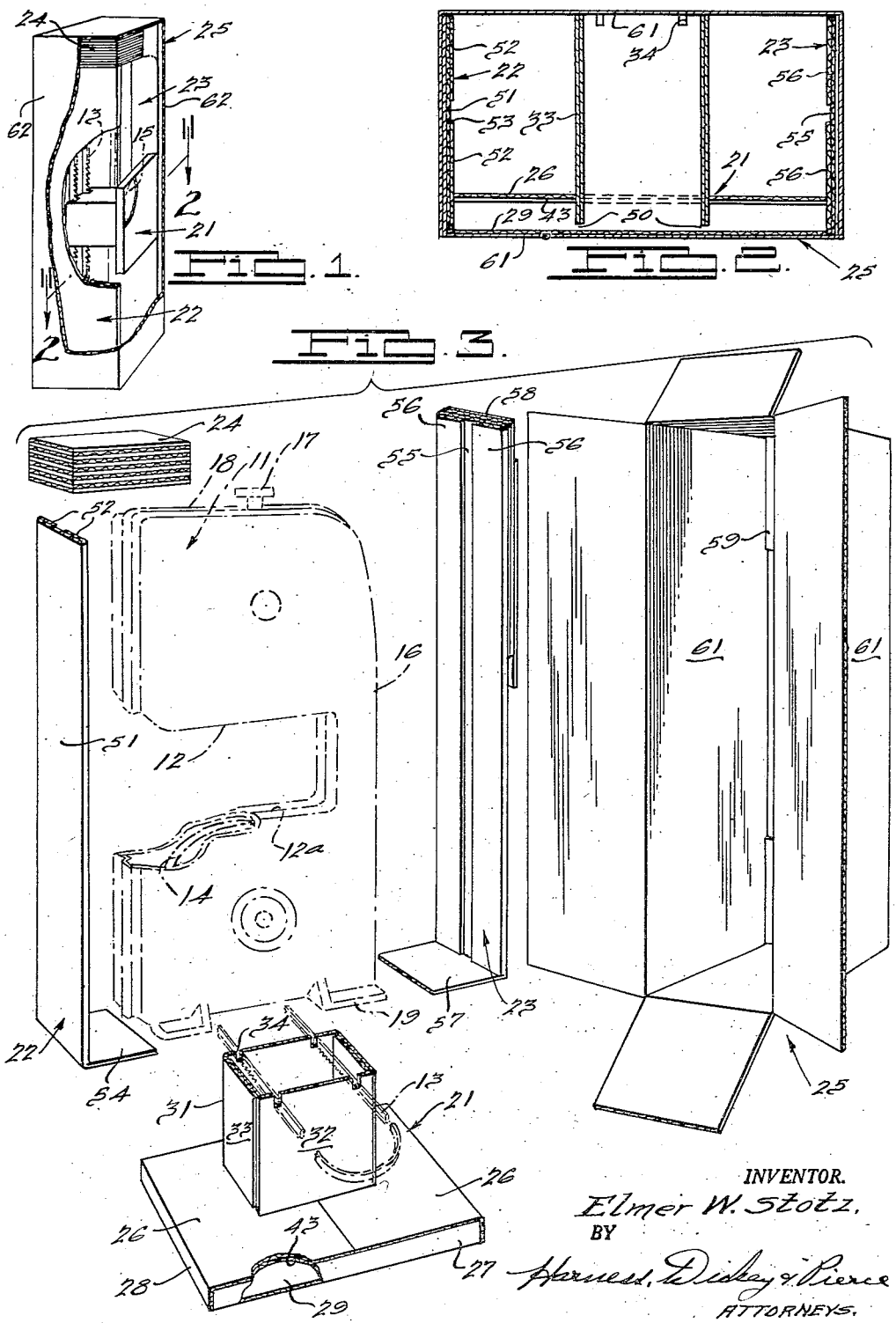
INVENTOR.
Elmer W. Stotz,
BY
Harness, Dickey & Pierce
ATTORNEYS.

Aug. 20, 1957     E. W. STOTZ     2,803,336
CASE FOR PACKING ARTICLES FOR SHIPMENT

Filed Feb. 23, 1951     2 Sheets-Sheet 2

INVENTOR.
Elmer W. Stotz.
BY
Harness, Dickey & Pierce
ATTORNEYS.

United States Patent Office 2,803,336
Patented Aug. 20, 1957

2,803,336

CASE FOR PACKING ARTICLES FOR SHIPMENT

Elmer W. Stotz, Monroe, Mich., assignor to River Raisin Paper Company, Monroe, Mich., a corporation of Michigan Application February 23, 1951, Serial No. 212,425

2 Claims. (Cl. 206—46)

This application relates to shipping containers and more particularly to a method and construction for packaging heavy metal objects such as band saw machines and the like for shipment.

In the ordinary packaging or container construction of this type, it is now customary to use materials having relatively high tensile and transverse rupture strengths, such as wood or wood-reinforced cardboard. The reason for the use of such materials is that the packaging of such heavy equipment is characterized by high localized stresses, and the complicated shape of the machine usually makes it difficult to support large areas of its exterior by means of the container.

In accordance with this invention a construction is provided for such heavy metal objects which may be fabricated solely of cardboard, or corrugated board, thus eliminating the cost and bulk of the more conventional packing materials. It is therefore an object of this invention to provide a shipping container construction which may be made solely of cardboard, or corrugated board and which engages and supports the object to be packed in such a way as to minimize the localized stresses on any part of the container. In particular, it is an object to provide a container for heavy machinery which is shaped to the contour of the machine so as to engage a large area of its exterior, and which embodies reinforcing means for intermediate portions of the container, thus obviating the danger of transverse collapsing or buckling of the container walls.

It is another object to provide an improved container construction having the above characteristics, which is especially adapted for packaging a band saw machine of the type having a C-shaped frame or housing and a detachable table. In particular, it is an object to provide such a container wherein a unit of said container supports and encloses the detachable table as well as the saw blade, said unit also serving as a supporting or reinforcing member for the outer shell of the container.

It is a further object of this invention to provide an improved shipping container for heavy metal objects having the above described characteristics, and which may be economically manufactured using conventional methods and materials.

It is also an object to provide a method of packaging a band saw machine of the type having a C-shaped frame or housing and a detachable table, wherein the table and saw blade are supported in spaced parallel relation with the housing, and the container shell is simultaneously supported against lateral buckling.

Other objects, features, and advantages of the present invention will become apparent from the subsequent description taken in conjunction with the accompanying drawings.

In the drawings:

Figure 1 is a perspective view of the container in assembled condition, with parts broken away for clarity and with the packaged machine shown in dot-dash lines.

Figure 2 is a plan cross-sectional view taken along the line 2—2 of Fig. 1 and showing the relation of the inner container elements to the outer box.

Figure 3 is an exploded perspective view of the various elements of the container, showing these elements in their disassembled condition.

Figure 4:
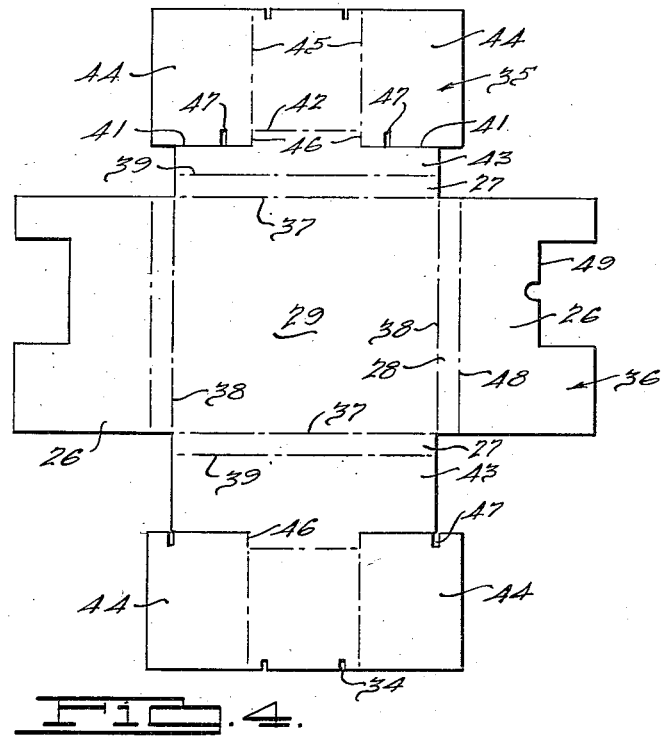
Figure 4 is a plan view of a preferred form of blank which may be used to construct the central support of the container.

The invention is shown in the illustrated embodiment as applied to the packing and shipping of a conventional band saw machine 11, although it will be understood that the principles of construction embodied in the container are equally applicable to the packing and shipping of other types of heavy machinery. The band saw machine 11, as shown in Fig. 3, is of a generally flat upright configuration, and is of general C-shape so as to provide a working space 12 within which the band saw and work move. The lower portion of this work space 12a supports a work table when the saw is in its finally assembled condition, the work being placed upon the work table and being moved against the band saw (shown in its packaged condition at 13 in Fig. 1) which runs around the lower or driving band wheel 14 and an upper band wheel within the upper portion of the casing. The work table (shown in its packaged condition at 15 in Fig. 1) is ordinarily attached to the supporting surface 12a by means of a plurality of attaching means such as bolts (not shown) which are integral with the table and extend downwardly therefrom. The back 16 of the machine housing is of slightly convex shape, having an inwardly curved contour as it approaches the top and an adjusting knob 17 projects upwardly from the top of the housing. A continuous upraised rib 18 projects outwardly from the housing along the matching edges of the housing halves, this rib extending entirely around the periphery of the housing. The bottom of the housing is provided with a plurality of feet 19 which extend downwardly and outwardly from the housing surface.

It will be seen from the above description that the problem of packing and shipping a device of this nature presents many problems which could not ordinarily be overcome by the sole use of a material such as cardboard. This invention provides a cardboard construction whereby the entire machine may be packed and shipped as a unit in a completely protected condition and without danger of localized stresses on the cardboard causing damage of or failure to the container. The container construction contemplates the removal or disassembly of the work table and the band saw from the remainder of the machine while being packed, so as to lessen the total required volume of the container and to obviate the danger of damage to the band saw or the work table.

The container comprises in general a central section 21, front and rear sections 22 and 23, a top spacer section 24 and an outer box or shell 25 which entirely encloses the machine as well as the aforementioned elements of the container. The central section 21, as best seen in Figure 3, comprises a flat rectangular base portion having upper panels 26, transverse side walls 27 and end walls 28, and a rectangular panel 29 (referred to as the central panel) in spaced relation to panels 26 and integral with the side and end walls. A hollow rectangular portion 31 extends through appropriate openings in panels 26 and extends outwardly from said panels, portion 31 being provided with side walls 32 and end walls 33. A series of four rectangular notches 34 are disposed at the outer edge of portion 31 in side walls 32. The central section 21 holds the work table 15 and the band saw 14 when the container is in its finally assembled condition. In particular, the work table is disposed between panels 26 and panel 29, the outer edges of the table being surrounded by walls 27 and 28. As shown in Figs. 1 and 3, the band saw is disposed in a coiled elliptical shape within slots 34, so that the plane of the band saw is parallel to that of the work table. The projecting bolts which are attached to the work table are so positioned as to project within the confines of hollow portion 31. The space within this hollow portion may also be utilized to hold other loose objects such as bolts and nuts which are to be used when the machine is finally assembled.

Figure 5:
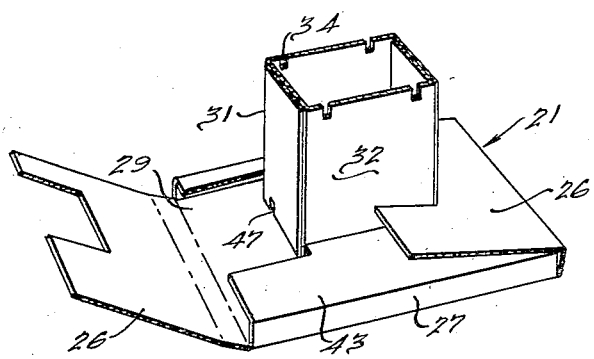
Figure 5 is a perspective view of the central support in partly assembled condition.

Figures 4 and 5 illustrate the manner in which the central section 21 is constructed, and these figures give a clearer picture of the functioning of this element of the container. Figure 4 shows the blank used for forming the section 21. As is seen in this figure, the central panel 29 has extending therefrom two oppositely disposed relatively long flaps 35 and two oppositely disposed relatively short flaps 36, the edges 37 and 38 of panel 29 constituting fold lines. The long flaps 35 form the hollow rectangular portion 31 of the assembled section 21, and also form the side walls 27. Fold lines 39 are in spaced parallel relation to fold lines 37, the side walls 27 being formed between these fold lines. Each panel 35 is cut or parted along lines 41 outwardly from and parallel to fold line 39, the flap being widened outwardly of these parting lines. A fold line 42 is provided a short distance outwardly of and between the parting lines, and a web portion 43 is thus formed between fold lines 39 and 42. A pair of oppositely disposed wing panels 44 are formed on flaps 35 by parallel fold lines 45, and the distance between fold lines 39 and 42 is such that when web portions 43 are folded into parallel relation with central panel 29, the distance between the edges 42 of the two panels 35 will be substantially equal to the width of wing panels 44. The blank is severed along lines 46 between the outer ends of fold line 42 and the inner ends of cuts 41, the length of lines 46 being substantially equal to the height of walls 27, less the thickness of the work table. It will be seen from Figure 5 that when side walls 27 are folded into transverse relation with central panel 29, and web portions 43 are folded inwardly so as to be parallel to panel 29, the panels 32 between wing panels 44 may be folded upwardly so as to constitute the side walls of the hollow rectangular portion 31. The wing panels 44 may then be folded transversely to panels 32 and in overlapping relation with each other so as to form the end walls 33.

The short flaps 36 are used to form the end walls 28 and the panels 26 which are parallel to panel 29. In particular, fold lines 48 are provided in spaced parallel relation to fold lines 38 and form the end walls 28. Panels 26, which are formed outwardly of fold lines 48, have rectangular recesses 49 cut from their outer edges to accommodate the chimney portion 21. As seen in Figure 5, when the short flaps 36 are folded upwardly and inwardly, the end walls 28 will be transverse to flap 29, and panels 26 will overlap web portions 43. It will be noted that in the illustrated embodiment the portion 31 is offset from the longitudinal center line of the section 21, although it will be understood that this dimension is not critical and may be varied to suit the particular machine. The wing panels 44 are provided with notches 47 at their inner edges, these notches being so positioned that when the flaps 44 overlap the notches will register. The purpose of notches 47 is to accommodate a rib or upraised portion (not shown) which is ordinarily integral with the work table 15. It will be noted that due to the length of cuts 46, the inner edges of the end walls 44 will be in spaced parallel relation to panel 29, this space 50 as shown in Fig. 2, being such as to accommodate the thickness of the work table. The table will thus be entirely surrounded by the material of the container, and will be securely held against movement.

The front section 22 and the rear section 23 are designed to securely hold the front and rear edges of the machine casing against lateral movement and at the same time to evenly distribute the stress on the container due to the weight of the machine. As is best seen in Figs. 2 and 3, the front section comprises an elongated strip of cardboard having a central or web portion 51 and flange portions 52 which are folded thereunder. The width of the flange portions is such that a space is left between their edges 53, this space being substantially equal to the width of the rib 18 which appears on the periphery of the housing. A lower extension 54 underlies the forward feet 19 when the container is assembled.

The rear section 23 of the container is substantially similar to the front section 22 and comprises an elongated strip of cardboard having a central panel 55, flange portions 56, and lower extension 57. In order to accommodate the curvature of the rear edge 16 of the housing, various thicknesses of packing or spacing cardboard 58 are used between the central panel 55 and the rear wall 59 of the outer container 25. This packing 58 will cause the cardboard strip 23 to follow the curvature of edge 15 and the flange sections 56 will thus securely grip the rib 18 along its entire length. The top spacer section 24 consists preferably of a plurality of cardboard panels of rectangular shape which are built up to a sufficient height to clear the adjusting knob 17.

In assembling the container, the table and the band saw are first disposed in the central container section 21, as previously described. When this is done, the section 21 is so positioned that the hollow rectangular portion 31 thereof is disposed within the work space 12 of the housing, the flat base portion of the section 21 being parallel to the side of the housing and spaced outwardly therefrom. The front and rear sections 22 and 23 are then properly positioned so that the rib 18 is securely gripped. Spacer section 24 and packing 58 are then put in place, and the outer container or shell 25 is then placed over the entire assembly. As is best seen in Fig. 2, the distance from the outer edge of the portion 31 to the panel 29 is substantially equal to the distance between side panels 61 of the shell 25. It will therefore be seen that positive lateral support is provided between these side walls of the shell. The distance between the front and rear panels 62 of shell 25 is such that front and rear sections 22 and 23 will be held firmly within the container, and the height of shell 25 is such that the spacer section 24 and the lower extensions 54 and 57 will be securely gripped. Moreover, the distance between front and rear walls 28 of the base portion of element 31 is such that it provides lateral support for sections 22 and 23, and the resulting unitary assembly will rigidly secure the machine with a minimum of localized stresses and unsupported area. It will be noted that since the saw blade and the work table are disposed on opposite sides of and parallel to the housing, the container will thus be of a minimum overall volume.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A cardboard container for packaging a band saw machine of the type having a generally C-shaped housing, a protruding rib on the periphery of said housing, and a detachable table having a protruding rib on one surface thereof, said container comprising an outer shell having side and end walls, front and rear reinforcing sections having shapes conforming respectively to the front and rear contours of a C-shaped housing of a band saw machine, said reinforcing sections having slots adapted to receive a rib on C-shaped housing and adapted to be held tightly between the end walls of said outer shell, and a holder for a table of a contained band saw machine comprising an enlarged base portion adapted to enclose the table and an elongated portion extending from said base portion, said elongated portion adapted to be disposed within the opening of the contained C-shaped housing and having slots for the reception of the table rib and holding means for the saw blade of the contained band saw machine, the length of said elongated portion being such that said holder abuts the opposite side walls of said outer shell, said base section extending between and abutting said front and rear reinforcing sections to form lateral supporting means therefor.

2. The combination according to claim 1, said holding means having a plurality of slots at the outer end of said elongated portion, said slots being adapted to hold the saw blade of the contained band saw machine in a plane parallel to said base portion.

References Cited in the file of this patent

UNITED STATES PATENTS

| | | |
|---|---|---|
| 1,131,948 | Osborn | Mar. 16, 1915 |
| 2,273,544 | Vandervort | Feb. 17, 1942 |
| 2,299,355 | Stoplman | Oct. 20, 1942 |
| 2,321,063 | Bohnke | June 8, 1943 |

FOREIGN PATENTS

| | | |
|---|---|---|
| 335,856 | Great Britain | Oct. 2, 1930 |
| 407,495 | Great Britain | Mar. 22, 1934 |